Patented July 6, 1948

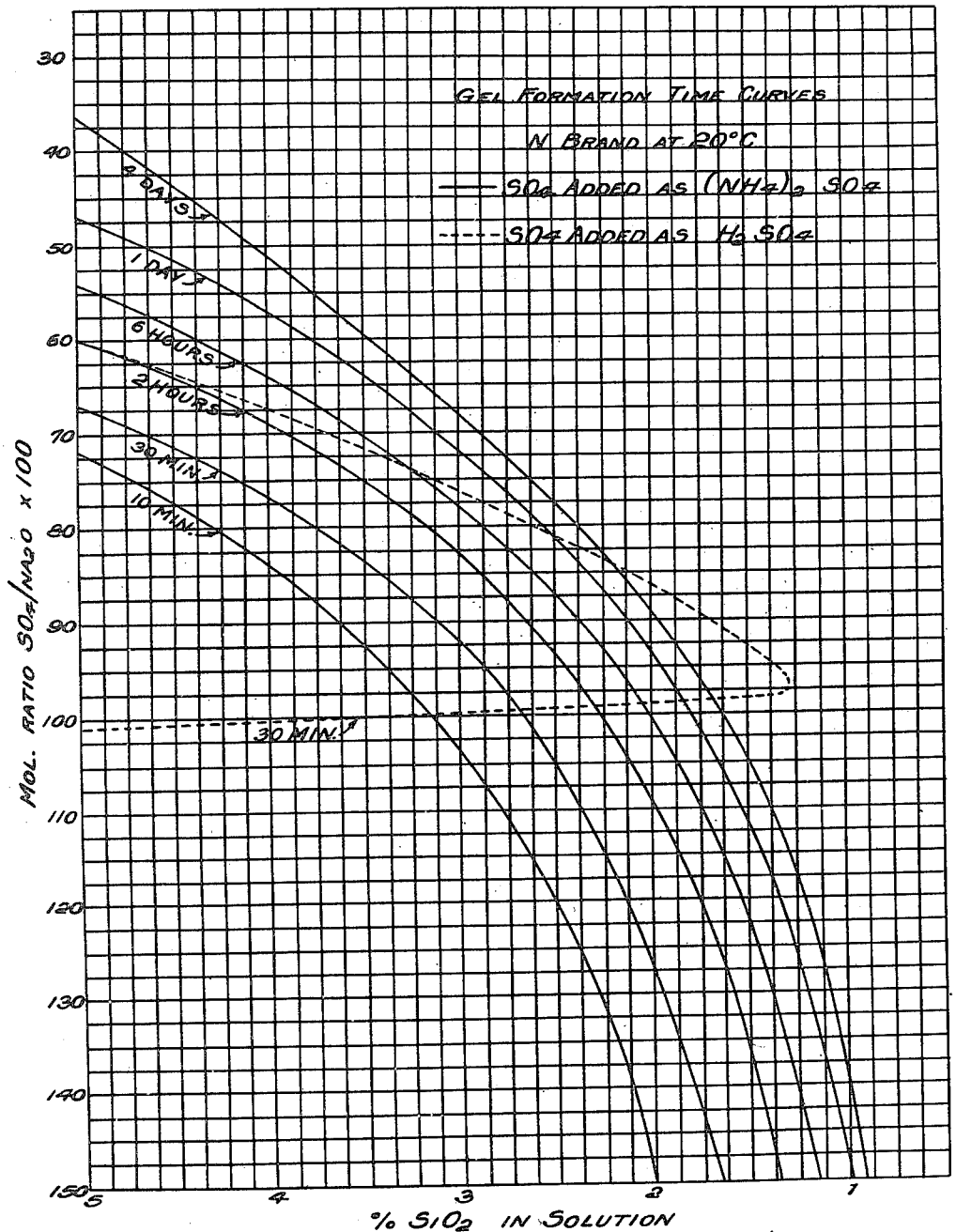

2,444,774

UNITED STATES PATENT OFFICE 2,444,774

PURIFICATION OF RAW WATERS

Harold R. Hay, Bryn Mawr, Pa., assignor to Philadelphia Quartz Company, Philadelphia, Pa., a corporation of Pennsylvania Application November 3, 1943, Serial No. 508,857

20 Claims. (Cl. 210—23)

This invention relates to purification of raw waters; and it comprises a method of clarifying and purifying raw waters, which can be clarified by the addition of the conventional coagulants, such as alum, iron salts and lime, for example, wherein a solution containing ammonium silicate and hydrolytic products thereof is employed as a coagulation aid, this solution being added to the raw water in conjunction with a conventional coagulant in order to improve the coagulation; said ammonium silicate solution being usually prepared by mixing an ammonium salt of an acid stronger than silicic acid with a high silicate ratio sodium silicate solution in such proportions as to supply from about 0.6 to 4.0 combining equivalents of said acid radical to 1 equivalent of the $Na_2O$ present in the silicate solution and sufficient normally to cause the mixture to form a gel after a short induction period, the mixture being advantageously aged for a period somewhat shorter than the induction period and usually then being diluted to produce stabilization and to prevent gel formation, prior to its addition to the raw water; all as more fully hereinafter set forth and as claimed.

It was discovered several years ago that the silica present in certain natural waters serves to improve the coagulation produced upon the addition of the conventional coagulants to these waters. Since that time several different methods of water purification have been developed which are based upon this discovery. In all of these methods a sodium silicate solution has been added to the raw water after mixing it with certain reactive chemicals to produce what has come to be known as a coagulation aid. In the most widely adopted method so far developed sulfuric acid is used as a reactive chemical. The acid is added to a sodium silicate solution, having a concentration of about 1.5 per cent $SiO_2$, in such proportions as to reduce the alkalinity to within the range of 1150 to 1250 P. P. M. expressed in terms of calcium carbonate equivalents and as determined by titration using methyl orange as an indicator. This partially neutralized solution is then aged prior to use and, if it is not to be used promptly, it must be diluted to a concentration of about 0.6 per cent $SiO_2$ in order to stabilize it and to prevent gel formation. The coagulation aid thus produced is added to the raw water together with the usual coagulant and a substantial improvement is produced in the resulting coagulation in the treatment of a large number of raw waters. The improvement in coagulation is attributed to the presence of colloidal hydrous $SiO_2$ in the coagulation aid. This acid method suffers from the disadvantages that the making of the coagulation aid requires the handling of sulfuric acid—a chemical which is not commonly used in water purification plants—as well as from the fact that a close control of alkalinity is essential for the production of best results. If the alkalinity of the coagulation aid is above 2000 a retarding rather than an accelerating effect is produced upon the coagulation, whereas if the alkalinity is below 700 a gel is likely to be formed. Moreover this acid method requires the use of acid proof equipment for the dilution and storage of the acid, large storage tanks to hold the diluted coagulation aid and large mixing tanks in which this coagulation aid is produced, owing to the dilute solutions employed.

Several other methods of using sodium silicate solutions as an aid to coagulation have been described all of which have suffered from at least some disadvantages. Some of these methods are applicable only to a few raw waters, others require close control and all require the purchase of chemicals in addition to the sodium silicate used in making the coagulation aid, as well as the use of special equipment of large storage capacity. None of these other methods has been widely applied in the water purification field.

I have discovered a method of preparing a coagulation aid, the use of which in water purification is free from most of the disadvantages inherent in the above methods and which, surprisingly, is capable of producing even better coagulation results than can be produced by these prior methods over a much wider range of concentrations and with much less accurate control. In this method the coagulation aid employed contains ammonium silicate and its hydrolytic products, this aid being usually prepared by mixing an ammonium salt of an acid stronger than silicic acid with a high silicate ratio sodium silcate soluton in such proportions that the combining ratio of the acid radical of the ammonium salt to the $Na_2O$ of the silicate present is at least about 0.6 to 1 and preferably at least 1 to 1. The chemical reactions which take place upon the mixing of these solutions can be pictured as follows: assuming the use of ammonium sulfate and of a sodium silicate solution which contains a ratio of $Na_2O$ to $SiO_2$ of 1 to 3.25:

$(NH_4)_2SO_4 + Na_2O \cdot 3.25SiO_2 + xH_2O \rightarrow$
$Na_2SO_4 + (NH_4)_2O \cdot 3.25SiO_2$ (ammonium
$\phantom{Na_2SO_4 + (NH_4)_2O \cdot 3.25SiO_2 \text{ (ammonium}}$ silicate) $+ xH_2O \rightarrow$
$Na_2SO_4 + 3.25SiO_2 \cdot yH_2O$ (silica sol) $+ 2NH_4OH$.

It will be noted from the above equation that, if sufficient ammonium sulfate is employed so that the Na₂O present is all bound as Na₂SO₄, all of the silica present is converted into a silica sol. I have discovered that optimum results are produced when at least sufficient ammonium sulfate is employed to produce this result and I attribute this to the fact that all of the SiO₂ is then in active form. The aid to coagulation produced, when lower combining ratios of SO₄ to Na₂O are employed, falls off substantially in proportion as the quantity of ammonium salt is reduced, which seems to indicate that the colloidal SiO₂ is the active principle involved. This probably accounts at least partially for the fact that this method produces results, which are superior to those which can be produced by the described acid method of the prior art, since in the latter the Na₂O present can be neutralized only to about 85 per cent owing to the danger of gel formation. Another factor which may partly account for the superior results obtained with my ammonium silicate coagulation aid is that this aid has a substantially higher alkalinity than that of the acid coagulation aid. It should be noted that, in the preparation of this aid, a salt rather than an acid is added to the silicate. This means that substantially no reduction in titratable alkalinity is produced. In fact the alkalinity of my aid may amount to 24,000 or over. It is known that the mobility of colloidal silica is greater, the higher the pH of the solution in which it is present. And it is quite possible that the increased mobility of the colloidal silica present in my aid, due to its higher pH, may account for its greater effectiveness in producing coagulation.

I have found that my ammonium silicate coagulation aid is somewhat more effective than the described acid aid when the ammonium salt is used in such proportions that approximately 85 per cent of the Na₂O present is bound as Na₂SO₄, for example, that its effectiveness rises substantially until 100 per cent of the Na₂O is bound and that its effectiveness remains at approximately this maximum point even though the quantity of ammonium salt is increased to a combining ratio of even 4 to 1 or above. In view of these facts it is evident that the accuracy of the control which is required in the production of my coagulation aid is only a fraction of that required in the production of the acid coagulation aid.

In general, in the making of my ammonium silicate coagulation aids, it is not feasible to employ combining ratios of acid radical (present in the ammonium salt) to Na₂O lower than about 0.6 to 1. The reason for this is that the effectiveness of my coagulation aid falls off rapidly below this point. Another peculiar phenomenon is that the stability of these low ratio coagulation aids is not increased appreciably by a reduction in temperature, as in the case of other ratios.

An important advantage gained by the use of my coagulation aid is that more concentrated solutions can be used in making this aid without the danger of gel formation. This is probably accounted for by the higher alkalinities of my aids. The hydrolytically produced ammonium hydroxide serves to buffer these aids and also appears to stabilize the colloidal silica.

In the preparation of the acid coagulation aid of the prior art, it is recommended that the solution of sodium silicate used be diluted to a concentration of 1.5 per cent SiO₂ before the addition of the acid. And the resulting mixture must be diluted to a concentration of 0.6 per cent SiO₂ before its addition to the water, unless used promptly. In contrast my coagulation aid can be prepared from sodium silicate solutions containing up to 5 per cent or more SiO₂ and the resulting mixtures can be stabilized by dilution to SiO₂ concentrations of up to 2 or 3 per cent. The comparative mixing and storage capacities required are, of course inversely proportional to the concentrations of these solutions.

My invention can be explained best by reference to the accompanying drawing wherein the figure is a graph showing curves of constant gelling time plotted as a function of the concentrations and combining ratios of SO₄ to Na₂O of my coagulation aids.

In the figure of the drawing several constant gelling time curves are plotted as a function of the combining ratios of SO₄ to Na₂O, as ordinates, and the concentration of SiO₂ in solution, as abscissas. The full line curves represent constant gelling times ranging from 10 minutes to 4 days of my new coagulation aids, while, for comparative purposes, a dotted line curve is given for the acid coagulation aids which have a gelling time of 30 minutes. These curves were obtained by making up a large number of sodium silicate solutions, having a molecular ratio of Na₂O to SiO₂ of 1 to 3.25, and having concentrations ranging from slightly less than 1 to about 5 per cent SiO₂, adding a dilute ammonium sulfate solution to these silicate solutions in various proportions and measuring the various times required to form a gel structure in these mixtures when held at a constant temperature of 20° C. This procedure gave a series of points representing various gelling times as a function of concentration and molecular ratios. These points were plotted and the curves given in the figure were then drawn through the points representing values of 10 minutes, 30 minutes etc. gelling times. The curve representing the use of sulfuric acid as a neutralizing agent was obtained in the same fashion except that sulfuric acid instead of ammonium sulfate was added to the various diluted solutions of sodium silicate.

It will be noted that the 30 minutes gelling curve for sulfuric acid has a rather sharp maximum at a value representing an SiO₂ concentration of about 1.3 per cent and an SO₄ to Na₂O ratio of 0.97. Maximum effectiveness of this acid coagulation aid occurs in the neighborhood of this maximum. And the effectiveness to this acid aid falls off rather rapidly on either side of the maximum. Unfortunately the use of this aid of maximum effectiveness is not feasible in commercial practice since the danger of gel formation is too great and for this reason, as mentioned previously, it is usually recommended that this acid aid have an alkalinity in the neighborhood of 1200, which represents a combining ratio of SO₄ to Na₂O of about 0.85.

It will be noted that the prior art acid aid of maximum effectiveness occurs at an SiO₂ concentration of only 1.3 per cent, whereas in contrast the 30 minutes curve representing my ammonium silicate aid crosses the line representing a combining ratio of 0.97 when the concentration is about 2.8 per cent SiO₂. The concentration advantage in favor of the ammonium silicate aid, is therefore more than 2 to 1 at this combining ratio. Moreover it is evident that, with the ammonium silicate aid, there is no danger of gel formation upon the addition of a slight excess of ammonium sulfate, as in the case of the addition of a slight excess of acid in making the acid aid.

The concentration advantage of the ammonium silicate aid falls off slowly as the combining ratio of $SO_4$ to $Na_2O$ is increased, as can be seen from a study of the curves, but the superior coagulating results produced at these higher combining ratios and the smaller accuracy of control required would still favor its use.

It might be considered that the use of ammonium sulfate, as in my process, would be more expensive than the use of sulfuric acid in the preparation of a coagulation aid. But the cost advantage is in reality in favor of the ammonium sulfate, if the comparative costs of the necessary equipment is considered. Moreover, in those purification plants making use of the so-called chloramine sterilization process, it is possible to discount entirely the cost of the ammonium sulfate. The reason for this is that the ammonium sulfate commonly used in the chloramine process can be employed in making the ammonium silicate coagulation aid, thus performing a double function. The quantity of ammonium sulfate employed in the chloramine process is usually adequate to produce the ammonium silicate coagulation aid; hence to use my process in combination with the chloramine process requires the purchase of only one additional chemical, namely sodium silicate. The cost of this is not only small but this cost is usually counterbalanced several times over by the saving made possible in the cost of alum or other coagulant.

In combining my process with the chloramine process it is only necessary to make up the coagulation aid, using the necessary quantity of ammonium sulfate to produce a combining ratio of $SO_4$ to $Na_2O$ of at least about 0.6 to 1 and to add this aid to the water in addition to the usual amount of chlorine and coagulant. The ammonia is then available to produce the desired chloramine. If the coagulation aid requires the addition of more ammonium sulfate than is required in the chloramine process, this excess has little or no effect upon the effectiveness of the sterilization produced whereas, if the chloramine process requires more ammonium sulfate than the minimum required in the production of a satisfactory coagulation aid, this excess can be added separately, if desired, or if added in the making of the coagulation aid, such excess does not reduce the effectiveness of the aid, as is evident from the preceding description. Owing to the fact that a satisfactory coagulation aid can be produced when the combining ratio of $SO_4$ to $Na_2O$ is varied all the way from about 0.6 to 4.0, it is usually possible to employ the exact quantity of ammonium sulfate required in the chloramine process and to adjust the amount of silicate solution to this quantity in the production of the coagulation aid.

There is still another way in which my process can be used in combination with the chloramine process in those rare cases in which less ammonium sulfate is employed in making the chloramine than the minimum required in the production of the coagulation aid. In this case part of the chlorine can also be added as a neutralizing agent in the making of the coagulation aid. The chemical reaction which takes place upon the addition of chlorine to a dilute sodium silicate solution can be represented as follows:

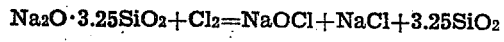

$$Na_2O \cdot 3.25SiO_2 + Cl_2 = NaOCl + NaCl + 3.25SiO_2$$

Chlorine is thus an effective neutralizing agent for sodium silicate solutions.

In order to obtain the advantages of the present process it is advantageous to employ the chlorine in such quantities, in the making of the coagulation aid, that no more than about 80 per cent of the $Na_2O$ is neutralized, that is, the combining ratio of $Cl_2$ to $Na_2O$ should not exceed a value of about 0.8. Otherwise the added ammonium salt will not adequately stabilize the coagulation aid. In addition to this chlorine part or all of the ammonium sulfate required to form chloramine is added to the silicate to produce the desired coagulation aid which is then added to the water in the usual fashion. In this way it is possible to combine my process with the chloramine process, without the purchase of chemicals other than sodium silicate, even when the chlorine and the ammonium sulfate taken together amount to no more than sufficient to bind about 60 per cent of the $Na_2O$ of the silicate. Very few water purifying plants, using the chloramine process, would employ a smaller quantity of chlorine and ammonium sulfate than this.

The optimum quantity of coagulation aid to be added to the raw water to produce flocculation ranges from about 1 to 10 parts $SiO_2$ per million parts of water. But owing to the reduced cost of the ammonium silicate method, it is economical to employ somewhat larger quantities of this aid than of the acid aid which is now rather widely used, for the reason that the use of larger quantities when properly balanced with the coagulant produces a higher degree of clarification.

The sodium silicate employed in the present process should have a high silicate ratio, that is the molecular ratio of $Na_2O$ to $SiO_2$ should range from about 1:1 to 1:4. The so-called "N" silicate of soda is particularly suited for this purpose, having a molecular ratio of about 1:3.25 and containing about 8.85 per cent $Na_2O$ and 28.5 per cent of $SiO_2$. It is, of course, possible to employ other alkali metal silicates, such as potassium silicate but this would be feasible only in exceptional cases. It is also possible to employ relatively pure ammonium silicate solutions as coagulation aids but this is more of academic than practical interest for the reason that no practical method of producing pure concentrated solutions of ammonium silicate at a reasonable cost has yet been discovered. Dilute solutions can be produced, however, from sodium silicate solutions with the use of cation exchanging zeolites, for example, or by the addition of ammonia to pure silica sols, prepared by dialysis or by treatment with the so-called hydrogen zeolites. These ammonium silicate solutions are usually in the state of incipient gel formation as prepared and can be used directly as coagulation aids.

My invention can be explained in more detail by reference to the following specific examples which represent practical operating embodiments of my process in which ammonium silicate containing solutions are employed as coagulation aids. These examples show how my process can be used either by itself or combined with the chloramine sterilization process.

EXAMPLE 1

In this example a series of standard laboratory clarification tests were conducted on Delaware River water to which had been added a sufficient amount of a standard clay suspension to produce a turbidity of 60 parts per million. This clay was added to increase the accuracy of measuring floc formation. Liter samples of this raw water were treated in a beaker equipped with a stirring device rotating 32 times a minute. The coagulation aid was added first, in amount sufficient to produce 6 P. P. M. $SiO_2$ and then a sufficient quantity of alum was added to produce 10 P. P. M. alum in the water. The formation of the floc was timed by a stop watch. In all cases the coagulation aid was aged for a period of 2 hours prior to its addition to the raw water. The clarification data obtained in these tests is collected in Table I below.

The coagulation aids used were all prepared from a standard silicate solution prepared by adding 174 grams of "N" silicate of soda to a liter of water and, in the tests employing ammonium sulfate, the standard ammonium sulfate solution used was made by dissolving 33.3 grams of $(NH_4)_2SO_4$ in one liter of water. The coagulation aids used in tests 1 to 5 were prepared as follows:

*Test 1.*—110 ml. standard silicate solution, 110 ml. standard ammonium sulfate solution, 280 ml. water.

Final alkalinity 5,500. Ratio $SO_4/Na_2O = 1.0$.

*Test 2.*—150 ml. standard silicate solution, 150 ml. standard ammonium sulfate solution, 200 ml. water. Original alkalinity 7444 P. P. M., reduced to 1920 P. P. M. by the addition of $Cl_2$.

*Test 3.*—60 ml. standard silicate solution, 60 ml. standard ammonium sulfate solution, 380 ml. water. Original alkalinity 3000 P. P. M., reduced to 340 P. P. M. by the addition of $Cl_2$.

*Test 4.*—The standard silicate solution was diluted to 1½% $SiO_2$ then reduced to an alkalinity of 1210 P. P. M. by the addition of sulfuric acid, aged two hours and diluted to 0.5% $SiO_2$.

*Test 5.*—Alum used without coagulation aid.

*Table I*

| Test No. | Floc appeared | Floc complete | Rate of settling |
| --- | --- | --- | --- |
|  | minutes | minutes |  |
| 1 | 4 | 8 | Good. |
| 2 | 3 | 5½ | Excellent. |
| 3 | 2½ | 4½ | Do. |
| 4 | 3 | 10½ | Good. |
| 5 | 7 | 19 | Fair. |

Test No. 5 was, of course, a blank, while test No. 4 represents the use of the prior art acid coagulation aid. The results obtained in tests 4 and 5 should therefore be compared with those of tests Nos. 1 to 3 to determine the comparative effectiveness of my ammonium silicate coagulation aid. It will be noted that in test No. 3 the silicate solution had a concentration of 0.62 per cent $SiO_2$ before the addition of the ammonium sulfate and the alkalinity employed was substantially below that recommended for the acid coagulation aid. The use of this acid was made possible by the stabilizing effect produced by the ammonium sulfate.

EXAMPLE 2

In this example tests were made on a raw water on a pilot plant scale, using an upflow water treating unit operating at a rate of 25 gallons per hour on a raw water having a color of 60 and a bicarbonate alkalinity of 239. This raw water was dosed with sufficient lime to obtain a 5 grain excess and with alum as a coagulant in the amount of 0.5 grain per gallon. The coagulation aid was made from 331 grams of "N" silicate of soda solution diluted with tap water to 1,900 ml. An ammonium sulfate solution was also made by dissolving 63.2 grams ammonium sulfate in tap water to 1,900 ml. These two solutions were mixed in a 5 gallon bottle, aged 22 minutes and then diluted to 19,000 ml. The resulting aid contained 0.5 per cent $SiO_2$. The upflow water treating unit was started at 11:00 a. m. The coagulation aid was fed at the rate of 75 ml. per minute, giving 4 P. P. M. $SiO_2$ in the treated water. At 12:00 noon it was found that the lime feed was insufficient to produce the desired 5 grain per gallon excess, so this was stepped up. At 12:45 the samples taken from the upflow water treating unit showed a larger and denser floc than had ever been obtained at this installation, even while using the acid coagulation aid which has been described previously. The new floc was more voluminous but settle more quickly. The per cent of solids (determined by the amount of sludge settling in a 100 ml. graduate in 5 minutes from a sample taken from an outlet 3 feet from the bottom of the upflow water treating unit) was 8, as compared with from 4.0 to 5.0 obtained with an acid coagulation aid. This test was continued over a second day during which time it was found possible to produce an effluent color of 18 with a turbidity as low as 10–11. These results were considered highly satisfactory and as demonstrating a marked superiority for the ammonium silicate coagulation aid.

EXAMPLE 3

The coagulation aid used in this example was made from a dilute sodium silicate solution having an alkalinity of 7,600 P. P. M., expressed as calcium carbonate equivalent, formed by adding 5.25 per cent "N" silicate of soda to water. Chlorine was passed into this solution until its alkalinity had fallen to 3,000 P. P. M. Then ammonium sulfate was added until the $SO_4/Na_2O$ ratio was 0.4. The resulting solution had about 60 per cent of its $Na_2O$ bound by the chlorine addition and 40 per cent by the ammonium sulfate. This solution was aged for 1 hour and diluted to produce a stabilized coagulation aid containing about 1.0 per cent $SiO_2$. This aid, when added to a raw water, in amount sufficient to produce 4 P. P. M. $SiO_2$ in the water, in conjunction with an alum feed of 7 parts per million, was found to produce excellent coagulation and clarification.

In these tests it was found that a coagulation aid of similar effectiveness could be produced by first adding the ammonium sulfate to the dilute silicate solution, followed by passing in chlorine until the alkalinity of the mixture had fallen to 3,000. These coagulation aids were found to be active sterilizing agents, the active agent being probably a mixture of chloramine and hypochlorite. It is evident that the chlorine and ammonium sulfate can be added in almost any suitable proportions to produce satisfactory coagulation aids, so long as the condition of rapid gel formation is avoided owing to the presence of the ammonium ion and so long as the bulk of the $Na_2O$ is bound, thus liberating the $SiO_2$ to form a silica sol.

While I have illustrated what I consider to be the best embodiments of my invention it is obvious that various details of the procedures which have been outlined can be varied without departure from the purview of this invention. It is evident that each water to be treated presents a different problem which in itself varies from time to time with local weather conditions and other factors. No very specific and detailed instructions can be provided which would be applicable in all cases. It is believed, however, that my method can be used to advantage in the treatment of all natural waters which can be classed as of the common or usual type. This includes the purification of sewage as well as various industrial wastes and other liquors. In practically all cases wherein industrial liquors are now being clarified with the aid of conventional coagulants, improved results can be obtained with the use of the present invention.

Any ammonium salt of an acid stronger than silicic acid can be used in the making of my coagulation aids from sodium silicate solutions. The most practical and the cheapest is, of course, ammonium sulfate. But ammonium carbonate, chloride, nitrate, phosphate, ammonium alum (aluminum ammonium sulfate) and ferric ammonium sulfate can be used practically.

In general it may be said that the benefits of the present invention can be realized by using as a coagulation aid any solution containing ammonium silicate and its hydrolytic products, the bulk of the silica being present in the form of a silica sol. If this solution is prepared from a sodium silicate solution partly neutralized with an acid, the alkalinity thereof should not be substantially below a value represented by the neutralization of about 90 per cent of the $Na_2O$ of the sodium silicate, while the ionic ratio of $NH_4$ to Na should be at least about 0.1 to 1. In other words at least about one $NH_4$ ion to ten Na ions should be present to buffer the solution and to produce a stabilizing effect. My coagulation aid can be defined as a silica sol stabilized by the presence therein of the ammonium ion or as a solution containing ammonium silicate and its hydrolytic products, the bulk of the silica being present in the form of a silica sol.

In preparing my coagulation aid from an alkali metal silicate solution it is only necessary to prepare a silicate solution having a ratio of alkali metal oxide to silica within the range of 1:1 to 1:4 and containing from about 1 to 5 per cent $SiO_2$, then to mix with this solution an ammonium salt of an acid stronger than silicic acid (with or without partly neutralizing the solution) in such proportions that the combining ratio of the acid radical of the ammonium salt to the $Na_2O$ ranges from about 0.6 to 4.0, this being followed advantageously by aging the mixture for a time insufficient to produce a gel. Two different procedures are then possible, (1) to add the resulting mixture directly to a raw water to be clarified, in addition to the conventional coagulant, and (2) to dilute the mixture with sufficient water to retard gel formation, followed by its addition to the raw water, in addition to the usual coagulant. The aging time can be varied rather widely but best results are usually obtained if this aging period is from about 20 to 90 per cent of the induction period, that is from 20 to 90 per cent of the period measured from admixture to gel formation. When the mixture reaches the state of incipient gel formation, the particles of the silica sol are apparently of optimum size to produce aid to coagulation; hence when the mixture reaches this point it should be promptly added to the raw water or diluted to stabilize the size of the colloidal silica particles.

It is, of course, possible to employ the present invention in a continuous process and the feed of the silicate and/or the ammonium salt may be dry, if desired. If dry feeds are used, the silicate, in the form of a quickly soluble hydrous solid, having a $Na_2O$ to $SiO_2$ ratio of at least 1:1, is dissolved in a stream of water and passed through an agitating zone in which it is mixed with the solution of an ammonium salt which may be prepared in a similar manner. This mixture is then aged in an aging zone, which may be a launder and then, if desired, diluted for stabilization purposes before being mixed with the raw water.

While I have mentioned the use of chlorine as an agent to partly neutralize the sodium silicate in the making of my coagulation aids, it is also possible to employ other acids, such as sulfuric acid, for this purpose. Any acid stronger than silicic acid is operative.

It has already been stated that my process can be used in connection with any of the usual coagulants, such as alum, iron salts and lime. It is only necessary that the coagulant employed be one which will produce an insoluble precipitate when reacted with colloidal silica. In some cases it is possible to produce adequate clarification using my coagulation aid as the sole coagulant. This is usually true, however, only in cases wherein the raw water contains dissolved salts, such as magnesium salts, for example, which will produce an adequate floc upon the addition of my coagulation aid. These cases are rather rare but where this method can be used it results in a substantial simplification of the clarification process.

With the aid of the chart shown in the accompanying drawing it is relatively easy to control the relative proportions of ammonium salt and sodium silicate in order to obtain either rather stable sols or solutions tending to gel within a short time which must be diluted for stabilization purposes unless they are used promptly. It is believed that those skilled in this art will have little or no difficulty in adapting my process to the clarification of raw waters in general with the aid of the present description. Optimum results are obtained with my ammonium silicate aid, as produced from sodium silicate and an ammonium salt, when the combining ratio of the acid of the ammonium salt to $Na_2O$ is within the range of about 0.75:1 to 1.5:1.

While I have indicated that aging of my coagulation aids is usually required for the production of optimum results, considerable improvement in coagulation can be obtained even when these aids are added to the raw water without special provision for an aging period. This is especially true of the aids which, when made, have induction periods of such length that they can be completely added to the raw water a short time before the ends of their induction periods. Of course, if such aids are normally not all consumed within their induction periods, it is desirable to age them for a time amounting to at least about 20 per cent of their induction periods, followed by dilution in order to stabilize them beyond their period of use. It is also possible to employ coagulation aids having higher concentrations and induction periods of only a few minutes. These can be continuously added to the raw water substantially as soon as they are formed by mixture of the required solutions. Other modifications of my process which fall within the scope of the following claims will be immediately evident to those skilled in this art.

What I claim is:

1. In the purification of raw waters, the process which comprises adding to the water a small amount of a water soluble coagulant which is capable of forming an insoluble precipitate when reacted with a silicate and, prior to the coagulation, adding to the water a coagulation aid comprising an aqueous solution containing ammonium silicate and hydrolytic products derived therefrom in small amount sufficient to react with said coagulant to produce a siliceous flocculent precipitate and consequent purification of said water and removing the precipitated solids from the water.

2. The process of claim 1 wherein said solution of ammonium silicate is produced by reacting an aqueous solution of sodium silicate containing from about 1 to 5 per cent $SiO_2$ and having a ratio of $Na_2O$ to $SiO_2$ within the range of about 1:1 to 1:4, with an ammonium salt of an acid stronger than silicic acid.

3. The process of claim 1 wherein said solution of ammonium silicate is produced by reacting a sodium silicate solution containing from about 1 to 5 per cent $SiO_2$ and having a ratio of $Na_2O$ to $SiO_2$ ranging from about 1:1 to 1:4, with a solution of ammonium sulfate.

4. The process of claim 1 wherein said solution of ammonium silicate is produced by mixing a dilute sodium silicate solution containing from about 1 to 5 per cent $SiO_2$ and having a ratio of $Na_2O$ to $SiO_2$ ranging from about 1:1 to 1:4 with an ammonium salt of an acid stronger than silicic acid followed by aging the mixture for a period not exceeding 90 per cent of that required to produce a gel from said mixture.

5. The process of claim 1 wherein said coagulant is alum.

6. The process of claim 1 wherein said coagulant is lime.

7. The process of claim 1 wherein said coagulant is an iron salt.

8. In the process of making coagulation aids for use in purifying raw waters, the steps which comprise mixing a dilute aqueous solution of sodium silicate, having a ratio of $Na_2O$ to $SiO_2$ ranging from about 1:1 to 1:4 and containing from about 1 to 5 per cent $SiO_2$, with a sufficient quantity of an ammonium salt of an acid stronger than silicic acid to produce a combining ratio of acid radical to $Na_2O$ of at least 0.6 to 1 and sufficient normally to produce a gel after a short induction period and, before said induction period is 90 per cent completed, diluting said mixture with water to stabilize the same, thereby forming a coagulation aid.

9. In the process of purifying raw waters with the use of coagulation aids and coagulants capable of forming insoluble precipitates when reacted with a soluble silicate, the step which comprises adding in small amount to the water a coagulation aid comprising an aqueous silica sol buffered by the presence therein of ammonium hydroxide.

10. In the chloramine process of sterilizing raw waters wherein the chloramine added to the raw water for sterilization purposes is formed from an ammonium salt of an acid stronger than silicic acid and chlorine, the steps which comprise adding at least part of said ammonium salt to a dilute aqueous solution of an alkali metal silicate containing from about 1 to 5 per cent $SiO_2$ and having a ratio of alkali metal oxide to $SiO_2$ ranging from about 1:1 to 1:4, the ammonium salt being added in such proportions that said solution tends to form a gel, and before the formation of said gel adding the resulting coagulation aid to the raw water to be purified and forming chloramine from said ammonium salt by reacting it with chlorine.

11. The process of claim 10 wherein at least part of the chlorine used in making the chloramine is added to said silicate solution in quantity not substantially greater than that required to reduce the alkalinity of said solution by 90 per cent.

12. In the chloramine process of sterilizing raw waters wherein the chloramine added to the raw water for sterilization purposes is formed from an ammonium salt of an acid stronger than silicic acid and chlorine, the steps which comprise adding at least part of said chlorine to a dilute aqueous solution of an alkali metal silicate containing from about 1 to 5 per cent $SiO_2$ and having a ratio of alkali metal oxide to $SiO_2$ within the range of about 1:1 to 1:4, in amount sufficient to reduce the alkalinity thereof not substantially more than 90 per cent, then adding at least part of said ammonium salt to said solution in quantity sufficient to produce a molecular ratio of $NH_4$ to $Na$ of at least about 0.1 to 1, adding the resulting coagulation aid to the raw water, and also adding to the raw water the rest of the chlorine required to produce chloramine by reaction with said ammonium salt and a coagulant, capable of forming an insoluble precipitate when reacted with a soluble silicate, in amount sufficient to form a floc with said coagulation aid, and removing precipitated solids from the water, thereby producing sterilization and purification of said water.

13. In the making of coagulation aids for use in the purification of raw waters, the process which comprises mixing an ammonium salt of an acid stronger than silicic acid with a dilute aqueous sodium silicate solution, having a ratio of $Na_2O$ to $SiO_2$ within the range of about 1:1 to 1:4 and a concentration ranging from about 1 to 5 per cent $SiO_2$, in amount sufficient to produce a combining ratio of acid radical to $Na_2O$ ranging from about 0.6 to 4.0 and to cause a tendency of said solution to form a gel after an induction period.

14. The process of claim 13 wherein said mixture is diluted with water to stabilize it after aging it for a period not exceeding 90 per cent of said induction period.

15. The process of claim 13 wherein sufficient ammonium salt is added to produce a combining ratio of acid radical to $Na_2O$ ranging from about 0.75:1 to 1.5 to 1.

16. In the making of coagulation aids for use in the purification of raw waters, the process which comprises partly neutralizing a dilute aqueous sodium silicate solution containing from about 1 to 5 per cent $SiO_2$ and having a ratio of $Na_2O$ to $SiO_2$ ranging from about 1:1 to 1:4, to the extent that its alkalinity is reduced not substantially more than about 90 per cent, then adding the ammonium salt of an acid stronger than silicic acid in amount sufficient to produce an ionic ratio of $NH_4$ to $Na$ of at least about 0.1 to 1 and to cause a tendency of said solution to form a gel after an induction period.

17. The process of claim 16 wherein said dilute silicate solution is neutralized by the addition of chlorine.

18. The process of claim 16 wherein said dilute silicate solution is neutralized by the addition of an acid stronger than silicic acid.

19. In the purification of raw waters, the process which comprises making a coagulation aid by adding ammonium sulfate to an aqueous sodium silicate solution, having a concentration ranging from about 1 to 5 per cent $SiO_2$ and having a ratio of $Na_2O$ to $SiO_2$ ranging from about 1:1 to 1:4, in proportion to produce a combining ratio of $SO_4$ to $Na_2O$ ranging from about 0.6:1 to 4.0:1 and to cause a tendency of the mixture to form a gel after a short induction period, then prior to the end of said induction period diluting said mixture to stabilize it and to prevent the formation of said gel, adding the resulting coagulation aid to a raw water and also adding to the water a coagulant, capable of forming an insoluble precipitate when reacted with a sodium silicate solution, in amount sufficient to form a voluminous floc with said coagulation aid, and then separating said floc thereby purifying said water.

20. In the purification of raw waters, the process which comprises making a coagulation aid by adding ammonium sulfate to an aqueous sodium silicate solution, having a concentration ranging from about 1 to 5 per cent $SiO_2$ and a ratio of $Na_2O$ to $SiO_2$ ranging from about 1:1 to 1:4, in amount sufficient to produce a combining ratio of $SO_4$ to $Na_2O$ ranging from about 0.6 to 1.5 and to cause the tendency of the mixture to form a gel after a short induction period, then prior to the end of said induction period diluting the mixture to stabilize it and prevent the formation of said gel, adding the resulting coagulation aid to the raw water in such proportions as to produce from about 1 to 10 P. P. M. $SiO_2$, also adding a quantity of coagulant adapted to form a voluminous floc with said coagulation aid, and separating said floc, thereby purifying said water.

HAROLD R. HAY.

REFERENCES CITED

The following references are of record in the file of this patent:

UNITED STATES PATENTS

| Number | Name | Date |
|---|---|---|
| 1,687,919 | Yablick | Oct. 16, 1928 |
| 1,943,487 | Ruth | Jan. 16, 1934 |
| 1,989,380 | Romans | Jan. 29, 1935 |
| 1,997,114 | Martin | Apr. 9, 1935 |
| 2,217,466 | Baylis | Oct. 8, 1940 |
| 2,234,285 | Schworm et al. | Mar. 11, 1941 |
| 2,241,641 | Magill | May 13, 1941 |
| 2,267,831 | Liebknecht | Dec. 30, 1941 |
| 2,307,466 | Noll et al. | Jan. 5, 1943 |
| 2,310,009 | Baker et al. | Feb. 2, 1943 |
| 2,310,655 | Schneider | Feb. 9, 1943 |

FOREIGN PATENTS

| Number | Country | Date |
|---|---|---|
| 451,826 | Great Britain | Aug. 12, 1936 |
| 499,247 | Great Britain | Jan. 20, 1939 |